(No Model.)
S. BUDLONG.
BELT FASTENER.
No. 471,518. Patented Mar. 22, 1892.
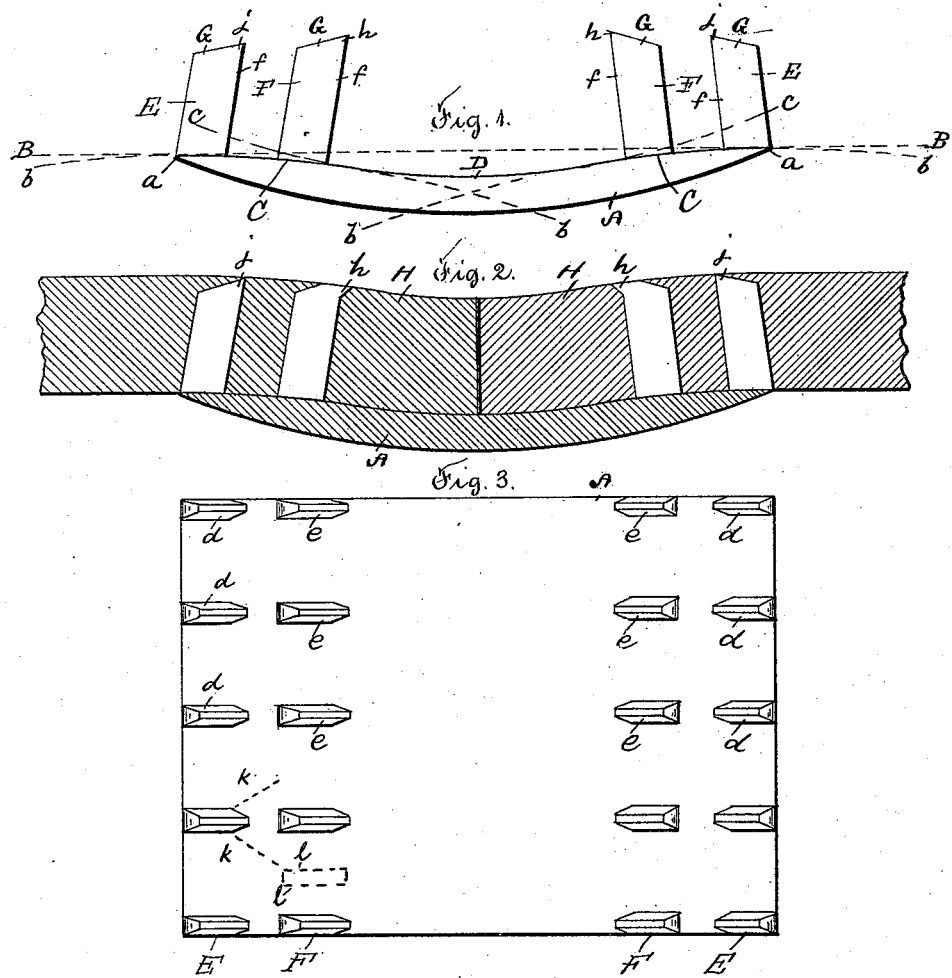
Witnesses
Walter S. Bowen
H. M. Fowler
Inventor
Simeon Budlong
By his Attorney
Rufus B. Fowler

UNITED STATES PATENT OFFICE.

SIMEON BUDLONG, OF CUMBERLAND, RHODE ISLAND.

BELT-FASTENER.

SPECIFICATION forming part of Letters Patent No. 471,518, dated March 22, 1892.

Application filed May 1, 1890. Serial No. 350,149. (No model.)

*To all whom it may concern:*

Be it known that I, SIMEON BUDLONG, a citizen of the United States, and a resident of Cumberland, in the county of Providence and State of Rhode Island, have invented a new and useful Improvement in Belt-Hooks, of which the following is a specification, reference being had to the accompanying drawings, representing a belt-hook embodying my invention, and in which—

Figure 1 represents an end view of a belt-hook in enlarged view. Fig. 2 is a transverse sectional view of the same with the ends of a belt attached. Fig. 3 is a plan view showing the toothed side of the plate.

Similar letters refer to similar parts in the different figures.

My invention relates to certain improvements in the manufacture of belt-hooks, as hereinafter described, and specifically set forth in the claim.

Referring to Fig. 1 of the drawings, A denotes the plate with edges $a\ a$. The broken line B B indicates the line of strain upon the belt when in use, and the inner surface of the plate A lying next the belt is a warped surface consisting of the convex sections C C, included in the arc of the circle $b\ b$, and these convex surfaces are united in the central section of the plate by the concave section D, included in an arc of the circle $c\ c$. Upon the convex portions C C are placed the teeth, arranged in Figs. 1 and 3 in two parallel rows on each side of the central section of the plate with the teeth in the outer rows behind the corresponding teeth of the inner rows, as shown in Fig. 3, where E denotes the outer rows and F the inner rows, with each of the teeth $d\ d$ of the outer rows standing behind a corresponding tooth $e$ of the inner rows. The teeth are preferably wedge-shaped and they are placed with their inner edges $f\ f$ forming an acute angle with the curved or convex surface C, upon which the teeth stand. The ends G of the teeth are beveled laterally, so that the inner edges of the teeth are the longest, with the beveled ends of the outer and inner rows substantially in the same plane, making the inner row of teeth longer than the outer row.

The ends of the belt are laid upon the points of the teeth and the teeth forced through the belt, as shown in Fig. 2. The inner row of teeth are slightly longer than the thickness of the belt H, and in consequence the tips of the inner row of teeth are bent forward, as at $h\ h$, Fig. 2, slightly clinching the end of the belt H and holding it firmly against the convex surface of the plate A. As the convex surface of the plate at the inner side of the base of the inner row of teeth is slightly lower than the line of strain B B upon the belt, the belt will be drawn firmly against the convex surface C of the plate.

The outer row of teeth E are made the thickness of the belt H in length, so their tips $j\ j$ are not bent forward in the operation of driving the belt H upon the teeth, thereby allowing the belt to be readily removed from the teeth by lifting the belt off the outer row of teeth in advance of the inner row. When the belt is in use, the strain upon the belt tends to rupture the belt in diagonal lines from the inner side of the base of the tooth, as indicated by the broken lines $k\ k$, Fig. 3, and in case the teeth were placed with the teeth of inner row in the position of the tooth shown by the broken lines $l\ l$ the line of rupture $k\ k$ would run to the puncture caused by the tooth $l\ l$, and the strength of the belt would thereby become lessened. To avoid this weakening of the belt I place the teeth of the outer rows E E immediately behind the teeth of the inner rows F F, as shown in Fig. 3, so that the resistance offered by a pair of teeth in the two rows will be in a line coincident with the line of strain upon the belt H.

It will be observed that the curved lines forming the arcs of the circles $b\ b$ are made tangent to the line of strain upon the belt indicated by the broken line B B at the edges $a\ a$ of the plate A, causing the belt to press closely against the plate A at the edges $a\ a$.

Belt-hooks have been in use provided with what are known as "chisel-pointed" teeth, having the ends of the teeth beveled on one side, so that the blow of a hammer in forcing the belt upon the teeth will turn the ends of the teeth over on one side and produce a clinch.

In the belt-hook forming the subject of my present invention the inner row of teeth only are clinched by the operation of forcing the belt upon the teeth, and the tips $h\ h$ are bent forward toward the center of the plate for the purpose of pressing the belt into the acute angle formed by the inner edge $f$ of the inner teeth and the convex surface of the plate at C, which, at its junction with the edge of the inner teeth, is lower than the line of strain indicated by the line B B.

What I claim as my invention, and desire to secure by Letters Patent, is—

A belt-fastener consisting of a plate provided with teeth upon one side to engage a belt, said side being convex at its ends and having teeth projecting from said convex ends, substantially as described.

Dated the 22d day of April, 1890.

SIMEON BUDLONG.

Witnesses:
RUFUS B. FOWLER,
H. M. FOWLER.